United States Patent
Pierron et al.

(10) Patent No.: US 12,281,820 B2
(45) Date of Patent: Apr. 22, 2025

(54) ELECTRIC DEVICE FOR HEATING A HEAT TRANSFER FLUID FOR A MOTOR VEHICLE

(71) Applicant: Valeo Systemes Thermiques, Le Mesnil-Saint-Denis (FR)

(72) Inventors: Frédéric Pierron, Le Mesnil Saint Denis (FR); Laurent Tellier, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 254 days.

(21) Appl. No.: 16/766,106

(22) PCT Filed: Nov. 26, 2018

(86) PCT No.: PCT/EP2018/082608
§ 371 (c)(1),
(2) Date: May 21, 2020

(87) PCT Pub. No.: WO2019/105898
PCT Pub. Date: Jun. 6, 2019

(65) Prior Publication Data
US 2020/0363100 A1    Nov. 19, 2020

(30) Foreign Application Priority Data

Nov. 30, 2017 (FR) ...................................... 1761489

(51) Int. Cl.
| | |
|---|---|
| *F24H 9/1818* | (2022.01) |
| *B60H 1/22* | (2006.01) |
| *F24H 1/00* | (2022.01) |
| *F24H 9/00* | (2022.01) |
| *H05B 3/82* | (2006.01) |

(52) U.S. Cl.
CPC ......... *F24H 9/1818* (2013.01); *B60H 1/2221* (2013.01); *F24H 1/009* (2013.01);
(Continued)

(58) Field of Classification Search
CPC ...... F24H 9/1818; F24H 1/009; F24H 9/0015; F24H 1/162; B60H 1/2221; H05B 3/82; H05B 2203/023
See application file for complete search history.

(56) References Cited

U.S. PATENT DOCUMENTS

| | | | |
|---|---|---|---|
| 9,167,629 B2 * | 10/2015 | Obst | ..................... B60H 1/2221 |
| 2007/0023418 A1 * | 2/2007 | Schlipf | ..................... H05B 3/04 |
| | | | 219/532 |

(Continued)

FOREIGN PATENT DOCUMENTS

| | | | | |
|---|---|---|---|---|
| CN | 105899888 A | 8/2016 | | |
| DE | 4315883 A1 * | 11/1994 | ........... | F24H 9/1818 |

(Continued)

OTHER PUBLICATIONS

English translation of DE-4315883-A1, dated Feb. 28, 2023 (Year: 2023).*

(Continued)

*Primary Examiner* — Edelmira Bosques
*Assistant Examiner* — Brett Peterson Mallon
(74) *Attorney, Agent, or Firm* — Osha Bergman Watanabe & Burton LLP

(57) ABSTRACT

The invention relates to an electric heating device for a heat transfer fluid for a motor vehicle, comprising at least:—a heating module;—a housing; and at least partially delimiting at least two circuits for conducting the heat transfer fluid; characterized in that—the heating module extends at least partially into said two conducting circuits.

6 Claims, 3 Drawing Sheets

(52) U.S. Cl.
CPC ............. *F24H 9/0015* (2013.01); *H05B 3/82* (2013.01); *H05B 2203/023* (2013.01)

(56) References Cited

U.S. PATENT DOCUMENTS

| | | | |
|---|---|---|---|
| 2014/0086566 A1 | 3/2014 | Waechter et al. | |
| 2014/0314398 A1* | 10/2014 | Pierron | B60H 1/2221 |
| 2015/0251519 A1* | 9/2015 | Leborgne | F24H 1/102 |
| | | | 392/491 |
| 2016/0288620 A1* | 10/2016 | Pierron | F24H 9/1818 |

FOREIGN PATENT DOCUMENTS

| | | | |
|---|---|---|---|
| FR | 3012872 A1 | | 5/2015 |
| FR | 3030994 A1 * | | 6/2016 |
| FR | 3042853 A1 | | 4/2017 |

OTHER PUBLICATIONS

English translation of FR-3030994-A1, dated Aug. 25, 2023 (Year: 2023).*
First Office Action in corresponding Chinese Application No. 20188007481.2, dated Apr. 2, 2021 (11 pages).
International Search Report and Written Opinion corresponding to International Application No. PCT/EP2018/082608, mailed Mar. 1, 2019 (10 pages).
Office Action issued in corresponding Chinese Application No. 201880077481.2, dated Jan. 26, 2024 (19 pages).
Althouse, A. D., Turnquist, C. H., & Bracciano, A. F. (2001). Modern Refrigeration and Conditioning. Shanghai Jiao Tong University Press. ISBN: 7-313-02747-8.

* cited by examiner

ELECTRIC DEVICE FOR HEATING A HEAT TRANSFER FLUID FOR A MOTOR VEHICLE

The invention relates to an electric device for heating at east one heat transfer fluid for a motor vehicle.

Usually, the heating of the air intended either for heating the passenger compartment of a motor vehicle, and/or even allowing demisting or defrosting, is ensured by the passage of an air flow through a heat exchanger, more specifically by a heat exchange between the air flow and a heat transfer fluid circulating in the heat exchanger. It is generally the coolant in the circuit of a heat engine of the motor vehicle.

In the case of an electric vehicle, since the vehicle has no thermal drive engine, the heating function is no longer performed by the circulation of the engine coolant in the heat exchanger of a ventilation, heating and/or air conditioning installation. In such a case, an autonomous hot water circuit can be provided for heating the passenger compartment.

However, this mode of heating by means of an autonomous hot water circuit may prove to be ill-adapted or inadequate to guarantee rapid and effective heating of the passenger compartment of the vehicle, in particular to ensure heating of the passenger compartment or defrosting or demisting when starting the vehicle in a very cold environment or when a very rapid rise in the temperature of the heat transfer fluid or of the air blown into the passenger compartment of the vehicle is desired.

Furthermore, in order to reduce the size and the cost due to an additional water circuit, it is also known to use, for an electric vehicle, an air conditioning loop operating in heat pump mode. Thus, the air conditioning loop, which conventionally makes it possible to cool an air flow using a refrigerant fluid, is in this case used to heat the air flow. To that end, an evaporator in the air conditioning loop can be used as a condenser.

However, this heating mode may still prove to be ill-adapted or inadequate. Indeed, the performance of the air conditioning loop in heat pump mode depends on the external climatic conditions, for example, when the outside air has too low a temperature, for example less than 5° C.

To overcome these drawbacks of the prior art, a known solution consists in adding to the heat exchanger or the heat transfer fluid circuit or even to the air conditioning loop, an electric device for thermal conditioning of a fluid, such as an electric device for heating the heat transfer fluid.

The object of the invention is to propose an electric heating device for heat transfer fluid in a motor vehicle which is simple to manufacture and assemble and is compact.

To this end, the invention relates to an electric heating device for a heat transfer fluid for a motor vehicle, comprising at least:
  a heating module;
  a housing; and
  at least partially delimiting at least two circuits for guiding the heat transfer fluid;
  characterized in that
  the heating module extends at least partially in said two guiding circuits.

Thus, a single heating module allows efficient heat transfer to the heat transfer fluid circulating in the two guiding circuits independently and in a common direction. This simplifies the structure and assembly of the device. In particular, the number of electric connections can be limited to what is strictly necessary for supplying and controlling the single heating module. In general, the device according to the invention is more compact while limiting the pressure drop in the device.

The electric heating device can also include one or more of the following features, taken separately or in combination:
  the two guiding circuits are parallel. Such a configuration makes it possible to minimize the bulk of the device and the pressure drop on the fluid;
  the two guiding circuits delimit a cylindrical internal volume. Such a configuration makes it possible to minimize the pressure drop on the fluid and the bulk of the device;
  the heating module further extends between the two guiding circuits;
  the heating module comprises a first main portion which extends in a guiding circuit, a second main portion which extends in another guiding circuit and an intermediate portion which connects the first and the second portion;
  the heating module extends in the two guiding circuits, forming a coil;
  the heating module includes two supply plugs;
  the two guiding circuits are further delimited by cores capable of channeling the flow of heat transfer fluid in the vicinity of the heating module;
  the cores are cylindrical;
  the heating module wraps around the cores;
  the housing includes two electric connectors capable of guiding the two supply plugs out of the housing; the two supply plugs are arranged on the same side of the housing;
  the cores comprise spacers which are arranged on at least part of a surface of the cores;
  the heating module is produced in the form of a tubular heating body, such as a shielded resistor;
  the housing includes at least one heat transfer fluid inlet and at least one heat transfer fluid outlet;
  the heat transfer fluid inlet and the heat transfer fluid outlet are made in the form of a pipe;
  the pipes forming the heat transfer fluid inlet and the heat transfer fluid outlet extend parallel in the same plane;
  the housing comprises a distribution chamber in which the heat transfer fluid inlet is formed, said distribution chamber being able to distribute the heat transfer fluid in the two guiding circuits, and a main body at least partially delimiting the two guiding circuits;
  the two supply plugs are arranged on the distribution chamber; the heat transfer fluid outlet capable of evacuating the heat transfer fluid from the device is provided in the main body;
  the main body comprises lateral reinforcement ribs;
  an annular member, such as a seal, provides a sealed junction between the distribution chamber and the main body;
  the heat transfer fluid outlet is arranged near one end of the main body;
  a partition extends from a wall of the distribution chamber toward the opposite end of the main body;
  the main body comprises a shape capable of receiving at least partially said partition of the distribution chamber;
  the distribution chamber includes a distributor capable of selectively distributing the heat transfer fluid to the two guiding circuits.

Other features and advantages of the invention will emerge upon reading the following description of a nonlimiting embodiment, with reference to the appended figures.

The electric heating device 2 according to the invention comprises a heating module 3, a housing 4 in which a heat transfer fluid can circulate which must be heated by the heating module 3. The housing 4 is capable of receiving the heating module 3. The device 2 delimits at least part of the guiding circuits 5a; 5b of the heat transfer fluid and the heating module 3 extends in the guiding circuits 5a; 5b. The housing 4 thus distinctly comprises a heating module 3 extending in the guiding circuits 5a; 5b and walls at least partially delimiting the guiding circuits 5a; 5b.

Figure 3:
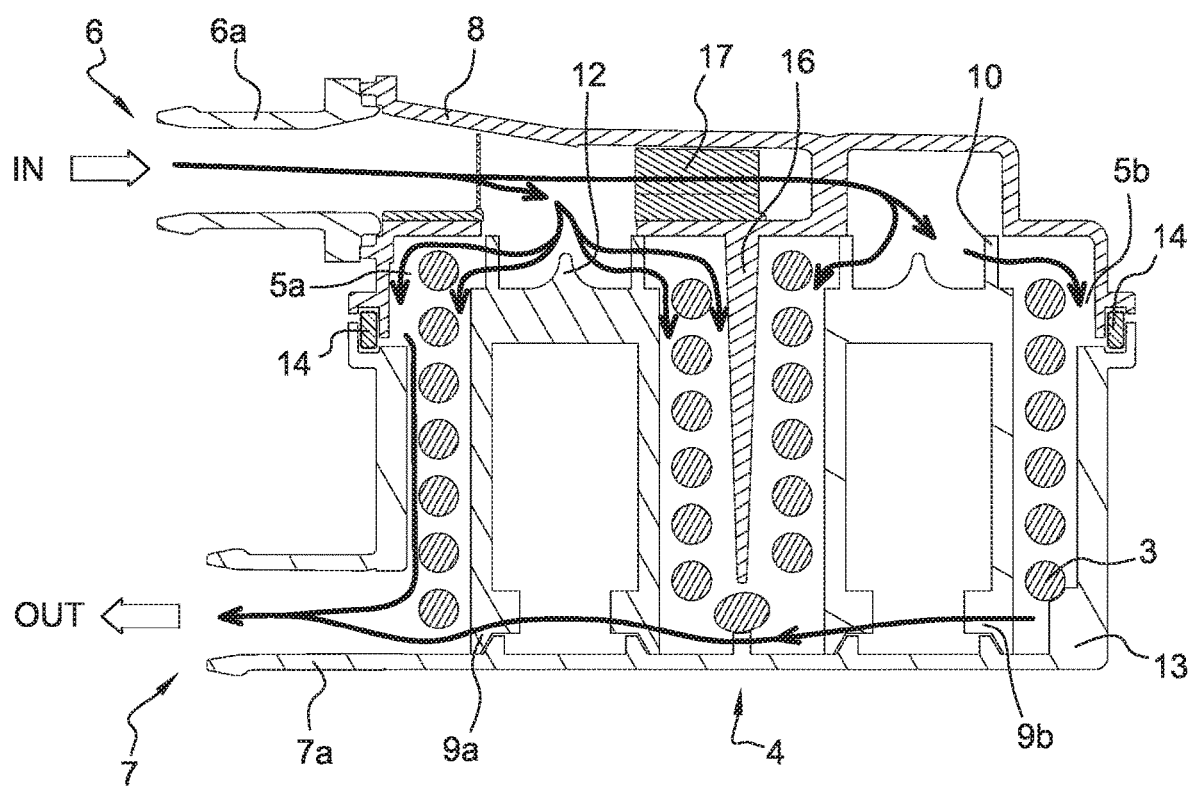
FIG. 3 illustrates a cross-sectional view of the heating device assembled according to the same embodiment.

According to the described embodiment, the heating module 3 passes through the internal space of each of the guiding circuits 5a; 5b. In other words, when the heat transfer fluid circulates in the electric heating device 2, the heating module 3 is bathed by the heat transfer fluid over its entire periphery. Arrows in FIG. 3 schematically represent the trajectory of the heat transfer fluid in the electric heating device 2 according to the embodiment described.

According to the same embodiment, the guiding circuits 5a; 5b are parallel and define a cylindrical internal volume. Such a configuration makes it possible to minimize the pressure drop on the fluid and the bulk of the device 2.

The heat transfer fluid to be heated can come, for example, from a glycol water circuit, if relevant from a cooling loop of a motor vehicle.

According to a preferred feature of the invention, the housing comprises a heat transfer fluid inlet 6, a heat transfer fluid outlet 7 and a distribution chamber 8 that is designed so as to distribute the heat transfer fluid in the guiding circuits 5a; 5b. The heat transfer fluid is admitted through the heat transfer fluid inlet 6 and passes through the distribution chamber 8. The heat transfer fluid is then separated into two flows, each being channeled in one of the guiding circuits 5a; 5b, in order to be heated. The heated heat transfer fluid is then removed via a heat transfer fluid outlet 7.

Arrows IN and OUT in the figures schematically represent the heat transfer fluid respectively entering and leaving said device 3 according to the embodiment described.

In a particular embodiment, the housing 4 comprises, in addition to the distribution chamber 8, a main body 13 in which are defined at least partially a first guiding circuit 5a and second guiding circuit 5b. According to this embodiment, the distribution chamber 8 covers the upper part of the main body 13, thus forming a cover.

According to the embodiment described, an annular member 14 provides a sealed junction between the distribution chamber 8 and the main body 13; and the main body 13 comprises lateral reinforcing ribs 113. The annular member 14 is in this embodiment a seal.

According to a particular embodiment, the inlet of heat transfer fluid 6 is provided in the form of an inlet pipe 6a in the distribution chamber 8 and the outlet of heat transfer fluid 7 is provided in the form of an outlet pipe 7a in the main body 13, near one end of said main body 13. Thus, the inlet pipe 6a is fluidically connected to the distribution chamber 8 and the outlet pipe 7a is fluidically connected to the guiding circuits 5a; 5b. According to the embodiment described, the inlet pipe 6a and the outlet pipe 7a extend parallel in the same plane.

According to the embodiment described, the distribution chamber 8 comprises a first enlarged portion substantially aligned with a first guiding circuit 5a. The inlet pipe 6a opens into the first enlarged portion of the distribution chamber 8. The distribution chamber 8 further comprises a second thinned portion which extends between the first guiding circuit 5a and the second guiding circuit 5b. Thus, the flow section of the heat transfer fluid decreases between the first guiding circuit 5a and the second guiding circuit 5b. The distribution chamber 8 finally comprises a third, cylindrical portion aligned on a second guiding circuit 5b.

In an embodiment which is not illustrated, a means for controlling the heating module 3 can be arranged under the distribution chamber 8. The control means can, for example, take the form of a printed circuit of PCB (printed circuit board) type, and thus control the electrical supply of the heating module 3. With the control means arranged under the distribution chamber 8 in this manner, the electronic components of the control means, being thermally coupled to the distribution chamber 8, can be cooled by the heat transfer fluid to be heated entering the device 2 through the distribution chamber 8.

According to a preferred feature of the invention, the housing 4 comprises electrical connectors 15a; 15b able to guide supply plugs 103a; 103b out of the housing 4.

According to the embodiment described, the supply plugs 103a; 103b are arranged on the same side of the housing 4, on the distribution chamber 8.

According to a preferred feature of the invention, the heating module 3 extends in a guiding circuit 5a; 5b, forming a coil. The term coil includes any tube wound in a spiral, helix, winding, twist, volute or any other shape combining a translation along an axis and a rotation around this same axis. The heating module 3 thus extends in the form of open loops otherwise called turns. Such a spatial configuration makes it possible to increase the length of the heating module 3 contained in the housing. The heating module 3 thus occupying more space in the device makes it possible to increase the heating power transmitted to the heat transfer fluid.

The heating module 3 is, according to the embodiment described, produced in the form of a tubular heating body, such as a shielded resistor.

According to a preferred feature, the tubular heating body is in one piece.

According to a preferred feature of the invention, a guiding circuit 5a; 5b is delimited by at least one core 9a; 9b in addition to being delimited by the device 2. A core according to the invention is able to channel the flow of heat transfer fluid in the vicinity of the heating module 3, the core 9a; 9b for example forming a cylinder.

According to the embodiment described, the two guiding circuits 5a; 5b are delimited by a core 9a; 9b. According to the embodiment described, the cylindrical cores 9a; 9b are arranged substantially in the center of the cylindrical interior volumes delimited by the walls of the guiding circuits 5a; 5b. The cores 9a; 9b thus form a cylinder of revolution delimited by a first circular base situated opposite the distribution chamber 8, a second circular base situated at the other end of the cylinder and a lateral surface. Thus, the cores 9a; 9b together with the walls of the guiding circuits 5a; 5b ensure the circulation of a water sheet of 1 to 2 mm around the periphery of the heating module 3.

It is of course conceivable that the guiding circuits 5a; 5b are not delimited by a core 9a; 9b but only by the walls of the guiding circuits 5a; 5b. In accordance with the invention, a core 9*a*; 9*b* may comprise at least one deflector 10, arranged for example on the first circular base of said core 9*a*; 9*b*.

The deflectors 10 are preferably made in the form of fins or blades which extend from the first circular base of the core 9*a*; 9*b*.

The deflectors 10 are, according to the embodiment described, arranged face to face near the periphery of the cylindrical cores 9*a*; 9*b* and symmetrically with respect to the center of revolution of the cylindrical cores 9*a*; 9*b*. In this embodiment, the deflectors 10 have the primary function of ensuring the positioning of the cores 9*a*; 9*b* in the guiding circuits 5*a*; 5*b*, in cooperation with walls of the distribution chamber 8 in the manner of a spacer. They also make it possible, thanks to their fin or blade shape, to distribute the fluid in the guiding circuits 5*a*; 5*b* and make the fluid rotate.

According to a preferred feature of the invention, a core 9*a*; 9*b* includes spacers 11, which extend from a surface of said core 9*a*; 9*b*, the spacers 11 being able to maintain a distance between the heating module 3 and said surface of the core 9*a*; 9*b*.

In the embodiment described, the spacers 11 extend radially around the periphery of the lateral surface of the cores 9*a*; 9*b*, parallel to the axis of revolution of the cylindrical cores 9*a*; 9*b*, and axially from the first circular base to a point which can be, for example, distant from the first circular base by a distance less than the height of the cylindrical cores 9*a*; 9*b*. Here the spacers 11 are made in the form of ribs.

In this embodiment, the heating module 3 comprises sections supported by said spacers 11, said supported sections being separated from one another by unsupported sections.

According to a preferred feature of the invention, the first circular base of a core 9*a*; 9*b* forms a relief.

Figure 1:
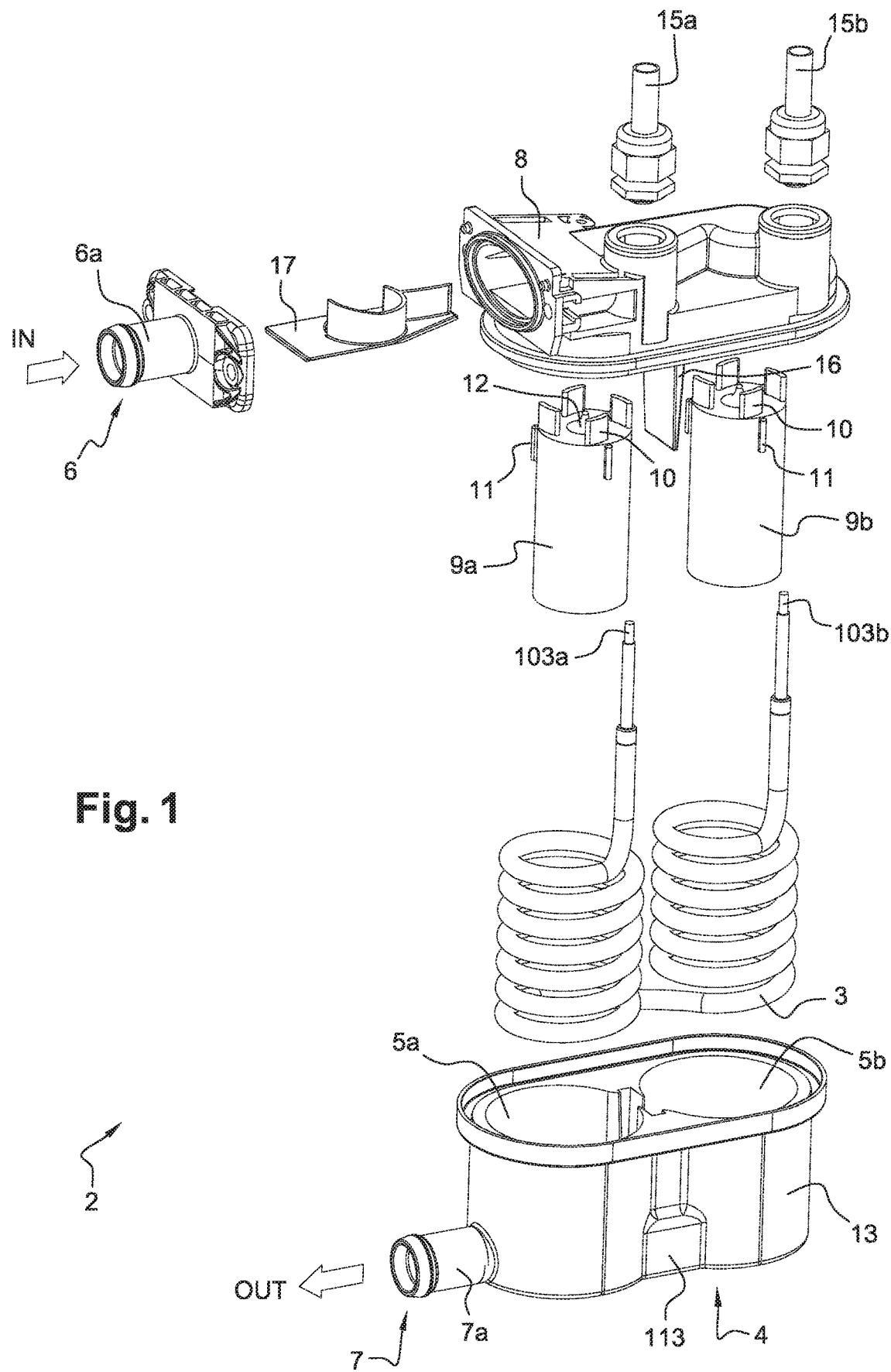
FIG. 1 illustrates an exploded view of the electric heating device according to the invention according to one embodiment.
Figure 2:
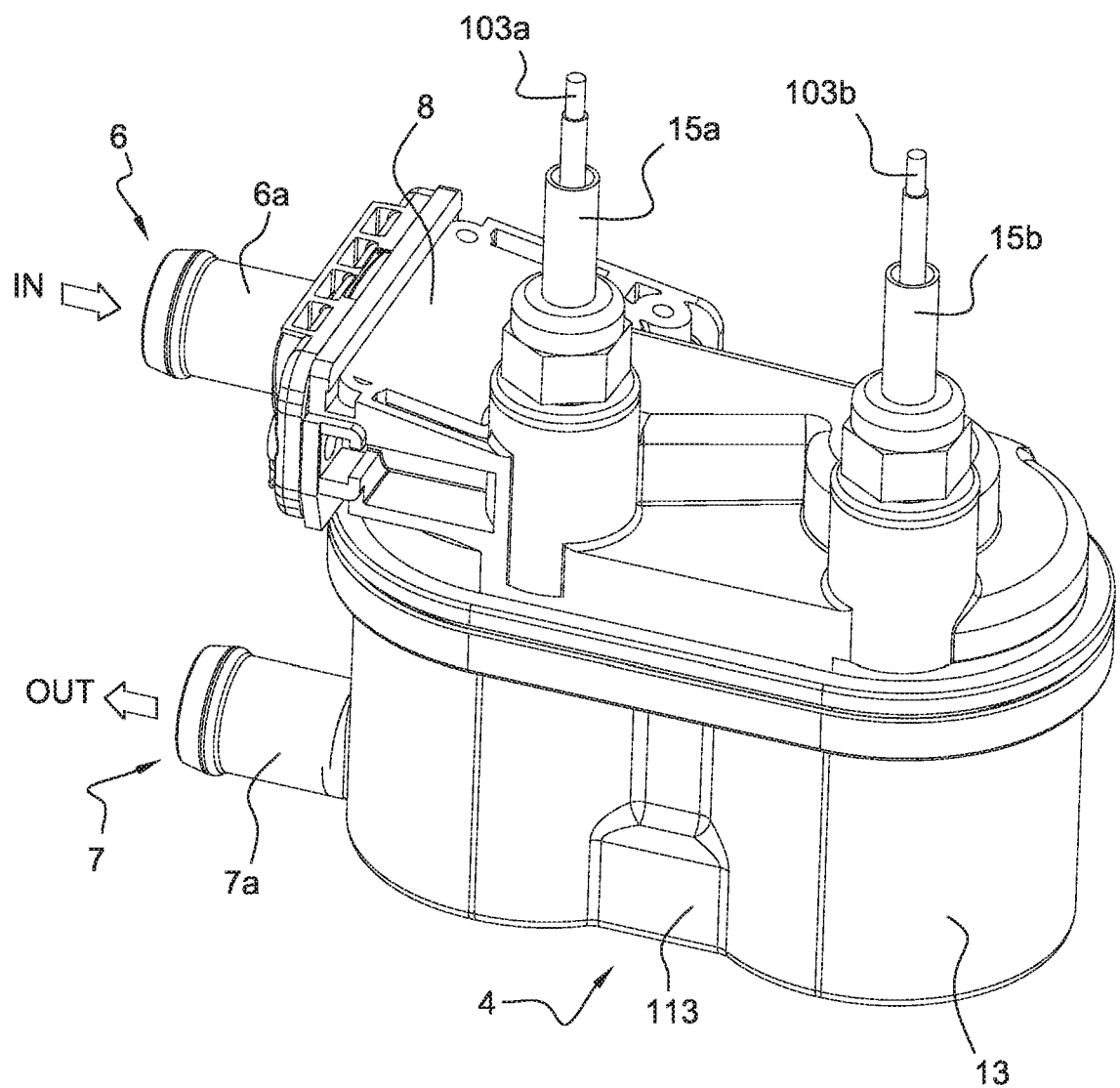
FIG. 2 illustrates an assembled view of the electric heating device.

In the embodiment illustrated in FIGS. 1, 2 and 3, a cone 12 extends from the center of the first circular base of the cores 9*a*; 9*b*. The cone 12 has a concave parabolic guiding curve, in the continuity of said first circular base. The axis of revolution of the cone 12 is coincident with that of the cylindrical cores 9*a*; 9*b*.

In addition, in the embodiment described, the cores 9*a*; 9*b* are hollow and the second circular base is perforated.

According to a preferred feature of the invention, the heating module 3 extends from a first end of the module constituted by the first supply plug 103*a*, through the distribution chamber 8 and in a guiding circuit 5*a*; 5*b*. The heating module 3 thus comprises a first main portion on which the heating module 3 extends, from the first supply plug 103*a*, through the distribution chamber 8 and through a guiding circuit 5*a*; 5*b*.

The heating module 3 comprises according to this same embodiment an intermediate portion on which the heating module 3 extends transversely between the guiding circuits 5*a*; 5*b*.

According to this same embodiment, the heating module 3 extends in another guiding circuit 5*a*; 5*b*. The heating module 3 thus comprises a second main portion on which the heating module 3 extends, from the intermediate portion, through said other guiding circuit 5*a*; 5*b* and through the distribution chamber 8, to a second end of the module consisting of the second supply plug 103*b*.

According to the embodiment described, the heating module 3 extends in the housing 4 in the form of a U, said U comprising two main portions parallel to each other which are wound in a coil in the guiding circuits 5*a*; 5*b*, around a core 9*a*; 9*b* respectively, and an intermediate portion forming the base of the U which extends between the two parallel main portions of the U.

Advantageously and as shown in FIG. 1, the heating module 3 extends over its intermediate portion in a rectilinear manner between the parallel main portions, in the extension of the turns between which said intermediate portion extends. Thus, the heating module 3 does not form any curve on the intermediate portion, which makes it possible to limit the pressure drop on the fluid.

According to a preferred feature, a partition 16 extends from a wall of the distribution chamber 8 toward the opposite end of the main body 13 of the housing 4.

According to the embodiment described, the partition 16 takes the form of a tongue which extends from a wall of the distribution chamber 8 toward the opposite end of the main body 13. The main body 13 of the housing 4 comprises a shape capable of at least partially accommodating the partition 16 of the distribution chamber 8. The partition 16 thus cooperates, by complementarity of shapes, with the main body 13 by at least partially delimiting the two guiding circuits 5*a*; 5*b*.

Such a feature makes it possible to facilitate the assembly of the various elements included in the device 2, and in particular to adapt the method of mounting the device 2 to the constraints imposed by the spatial configuration of the heating module 3 according to the invention.

According to the invention, the distribution chamber 8 comprises a distributor 17 capable of selectively distributing the heat transfer fluid toward the guiding circuits 5*a*; 5*b*. The distributor 17 allows the heat transfer fluid to be distributed homogeneously toward the guiding circuits 5*a*; 5*b* to ensure an equivalent heat transfer fluid flow in each of the guiding circuits 5*a*; 5*b*. This makes it possible to avoid excessive temperature differences between different points on the surface of said module 3.

According to the embodiment described, the distributor 17 is aligned on a first guiding circuit 5*a*. Thus the distributor 17 is arranged in the enlarged portion of the distribution chamber 8.

The distributor 17 takes in particular the form of a plate arranged in a horizontal plane parallel to the section of the first guiding circuit 5*a*. The plate is pierced with an orifice aligned with the first guiding circuit 5*a*. A bevelled wall extends vertically from the distributor plate 17 along a part of the periphery of said orifice. The bevelled wall is delimited on said periphery by a first and a second vertical edge. The first edge is arranged at a point around the periphery of the orifice closest to the heat transfer fluid inlet 6. In addition, an additional wall extends in a direction substantially opposite to that of the inlet pipe 6*a*, from said cylindrical wall at a point substantially diametrically opposite the first edge.

It should be understood that this exemplary embodiment is given by way of illustration of the subject of the invention. The invention is not limited to this above-described embodiment which is provided only by way of example. It encompasses various modifications, alternative forms and other variants which a person skilled in the art may envisage within the scope of the present invention.

The invention claimed is:

1. An electric heating device for a heat transfer fluid for a motor vehicle comprising:
   a single heating module; and
   a housing;
   the electric heating device at least partially delimiting at least two guiding circuits for guiding the heat transfer fluid;
   wherein the single heating module:
      extends at least partially in said two guiding circuits,
      comprises an intermediate portion,
      extends transversely between the two guiding circuits on the intermediate portion, and
      further comprises a one-piece tubular heating body including the intermediate portion;
   wherein the single heating module is in the form of a shielded resistor having the one-piece tubular heating body in direct contact with the heat transfer fluid;
   wherein the housing comprises:
      a distribution chamber in which there is formed a heat transfer fluid inlet for the heat transfer fluid, said distribution chamber being configured to distribute the heat transfer fluid in the two guiding circuits, and
      a main body in which the two guiding circuits are at least partially delimited;
   wherein the distribution chamber comprises a partition extending from a wall of the distribution chamber toward an opposite end of the main body, the main body comprising a shape configured to receive at least in part said partition of the distribution chamber,
   wherein the distribution chamber comprises a distributor able to selectively distribute the heat transfer fluid to the two guiding circuits, the two guiding circuits comprising a first guiding circuit, and
   wherein the distributor is formed as a plate pierced with an orifice that is aligned with the first guiding circuit.

2. The device as claimed in claim 1, wherein the two guiding circuits are further delimited by cores configured to channel a flow of heat transfer fluid in a vicinity of the single heating module.

3. The device as claimed in claim 2, wherein the single heating module is wound around the cores.

4. The device as claimed in claim 2, wherein the cores comprise spacers which are arranged on at least part of a surface of the cores.

5. The device as claimed in claim 1, wherein the heat transfer fluid comprises liquid coolant.

6. An electric heating device for a heat transfer fluid for an electric vehicle comprising:
   a single heating module;
   a housing; and
   at least two parallel circuits for guiding the heat transfer fluid, the at least two parallel circuits being at least partially delimited by walls of the electric heating device,
   wherein the single heating module:
      extends at least partially in said at least two parallel circuits,
      comprises an intermediate portion, and
      extends transversely between the two guiding circuits on the intermediate portion,
      wherein the at least two parallel circuits delimit a cylindrical internal volume, and
      the single heating module further comprises a one-piece tubular heating body including the intermediate portion, and
   wherein the single heating module is in the form of a shielded resistor having the one-piece tubular heating body in direct contact with the heat transfer fluid;
   wherein the housing comprises:
      a distribution chamber in which there is formed a heat transfer fluid inlet for the heat transfer fluid, said distribution chamber being configured to distribute the heat transfer fluid in the two guiding circuits, and
      a main body in which the two guiding circuits are at least partially delimited;
   wherein the distribution chamber comprises a partition extending from a wall of the distribution chamber toward an opposite end of the main body, the main body comprising a shape configured to receive at least in part said partition of the distribution chamber,
   wherein the distribution chamber comprises a distributor able to selectively distribute the heat transfer fluid to the two guiding circuits, the two guiding circuits comprising a first guiding circuit, and
   wherein the distributor is formed as a plate pierced with an orifice that is aligned with the first guiding circuit.

* * * * *